Patented Jan. 5, 1937

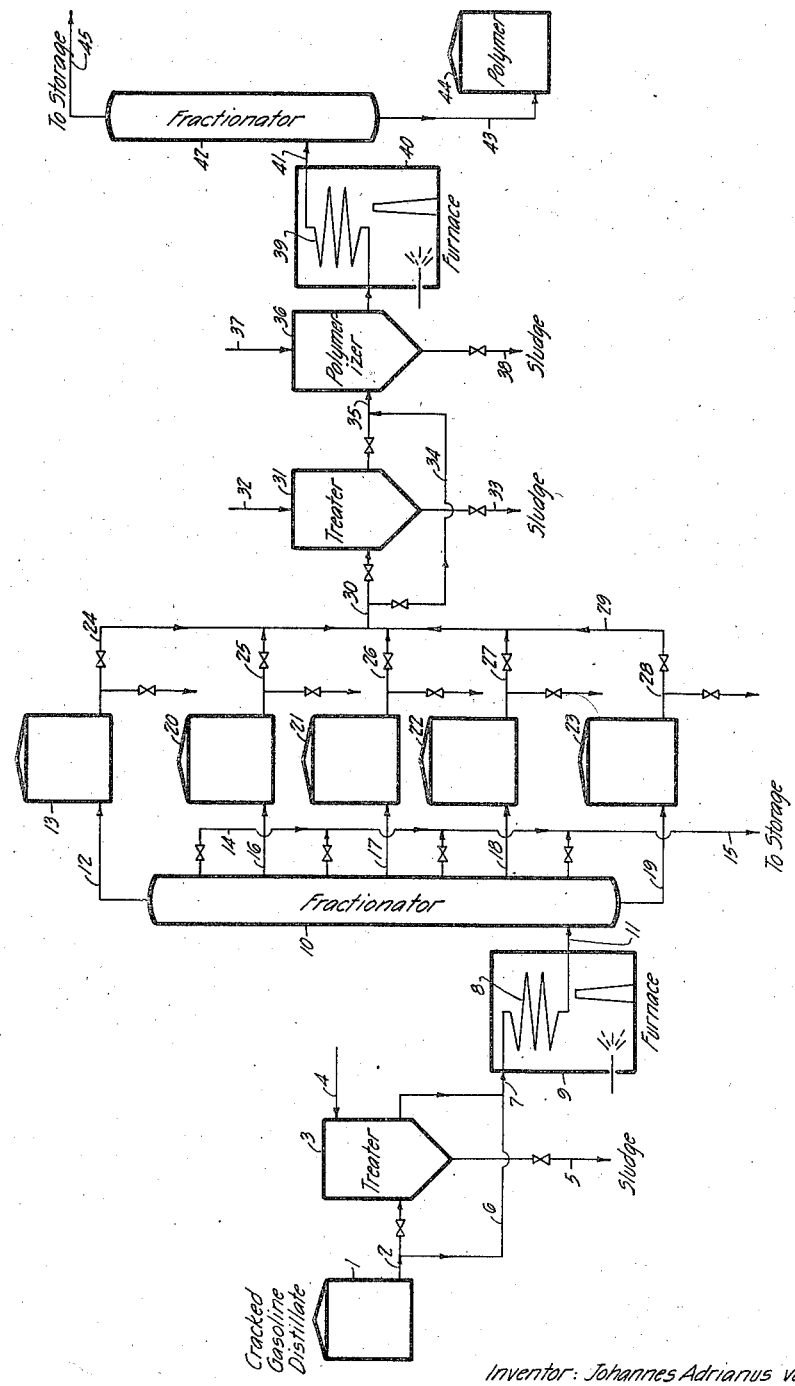

2,067,030

UNITED STATES PATENT OFFICE 2,067,030

METHOD FOR TREATING MINERAL OIL DISTILLATES

Adrianus Johannes van Peski, Amsterdam, Netherlands, assignor to Shell Development Company, San Francisco, Calif., a corporation of Delaware Application October 30, 1933, Serial No. 695,845
In the Netherlands November 3, 1932

2 Claims. (Cl. 196—78)

The invention relates to a process for the manufacture of high grade products, such as non-oxidizing lubricating oils, transformer oils and the like, by polymerization of unsaturated hydrocarbons.

It is known that hydrocarbon mixtures containing unsaturated hydrocarbons and obtained, for instance, by cracking mineral oils, paraffin wax, vaseline, tar oils and the like, can be polymerized to viscous oils with the aid of polymerizing agents such as metal chlorides, silica gel and such like or for instance by subjecting such mixtures to the action of silent electric discharges.

It was noted that, when hydrocarbon mixtures, such as cracked distillates, which contain among other components unsaturated hydrocarbons, are subjected to a polymerization treatment without being previously refined, the resulting synthetic viscous oils in many cases are insufficiently stable against high temperature, especially in the presence of oxygen or other oxidizing substances. Consequently such oils readily deteriorate and cannot be regarded for example as high grade lubricants.

It is an object of my invention to provide a process for the polymerization of polymerizable bodies, and especially cracked distillates, for the production of oils which will be stable against oxidation and/or possess desirable flow characteristics. It is a further object to provide a process for polymerizing said bodies by selecting from a mixture of polymerizable bodies those constituents which will yield the desired product. It is a further object of my invention to increase the yield of the desirable polymerization products by selecting for polymerization only fractions which possess good polymerizing qualities. Other objects of my invention will be apparent to those skilled in the art from a reading of this specification.

It has now been found that high grade products, such as non-oxidizing lubricating oils, transformer oils and the like, can be obtained from products of cracking, such as vapor phase cracked distillates, which, as such, may be unsuitable for manufacture of synthetic oils by polymerization. To this end, the objectionable components, or fractions which are responsible for making such distillates unsuitable for polymerization, are removed by fractionation, for example, and the remaining cracked products are then subjected to a polymerizing treatment for producing stable synthetic oils. The suitability of the fractions can be determined experimentally. The removed fractions may be used as motor fuels. In other words it has been found that any cracked distillate is composed of fractions having different polymerizing qualities and that by efficient fractional distillation (or by fractional condensation, if the distillate is available in the vapor state) fractions of relatively high polymerizing quality can be separated from fractions of low polymerizing quality, i. e. those which contain objectionable components. The efficiency of the fractional distillation is usually measured by the overlap of the distillation ranges as determined by the A. S. T. M. distillation, and it is desirable that the fractionation be efficient to such a degree that the A. S. T. M. distillation ranges of consecutive fractions show an overlap of not more than 10%.

When investigating a cracked distillate of unknown properties, the normal procedure consists of first analytically fractionating the distillate into fractions having a boiling range of approximately 10° C. The properties of individual fractions which may reflect suitability for polymerization such as iodine number, content of unsaturates, sulfur, etc. are determined by known analytical methods or by actual polymerizing tests under standardized conditions. Certain of the fractions may be re-fractionated into still narrower fractions to determine whether desirable and undesirable compounds can be further separated. The data so obtained clearly reveal a greater suitability for polymerization of certain fractions or combinations thereof over others, and in carrying out routine fractionations subsequent to the first analytical fractionation, conditions can be so controlled in accordance with the analytical data, to produce two series of alternate fractions, one which is suitable for polymerization and another one which is not. The boiling ranges of individual fractions obtained in routine fractionation may vary considerably from each other, depending largely on the distribution of unsaturated polymerizable compounds.

It has further been found that when certain fractions of sulfur bearing cracked light distillates are subjected to polymerization, only small yields of lubricating oils are obtained, which oils, moreover, are insufficiently stable against oxidation. It was also found that just those fractions which differ from the next fraction by their relatively high sulfur contents, produce unsatisfactory yields and low grade lubricating oils. In the course of fractionating cracked distillates, such relatively sulfurous fractions were found to alternate with fractions which are relatively low in sulfur content. The fact that organic sulfur compounds apparently have a deleterious effect was evident from the polymerization of sulfur-free cracked distillates to which small quantities of thiophene, amyl sulphide, amyl mercaptan, propyl mercaptan, thiophenol and the like had been added, which resulted in a considerable reduction of the yield of lubricating oil.

It is advisable, therefore, to remove from a cracked distillate, prior to the polymerization those fractions which are distinguished from the next fractions by relatively high sulfur content and whose sulfur content is higher than the integrated average sulfur content which corresponds to the approximate boiling range of these fractions. The remaining fractions can then be polymerized to viscous synthetic oils either after being refined or not, and either separately, or after being partly combined.

The fractions having higher sulfur contents were found, as a rule, to have relatively higher contents of aromatics.

It may some times be desirable, before polymerizing the fractions, first to remove other undesirable components that may be present, for instance, by treating with sulphuric acid and/or applying a pre-polymerization.

The cracked product, for instance, may be subjected to a most careful, i. e. efficient, fractionation, and those fractions which contain unsaturated hydrocarbons particularly suitable for polymerization are subjected to a chemical treatment for further separation of the undesired components.

The following is an example of a suitable form of application of the invention: Before being separated into fractions by fractional distillation, a cracked product may be treated with strong acids, such as sulphuric acid and phosphoric acid of suitable concentration, if necessary followed by a lye treatment. In that case, as a result of the chemical reaction, there may be a disproportional displacement of the boiling ranges of the hydrocarbons to such an extent that by fractional distillation following such chemical treatment fractions particularly suitable for polymerization are separated from the other components much more sharply than is the case when no treatment with sulphuric acid or phosphoric acid or the like is previously used.

This embodiment of the invention can be applied to various cracked products. In certain cases, however, it may be advantageous while applying it to begin with cracked products which have been subjected to fractional distillation prior to the acid treatment.

Referring to the attached drawing which represents a flow diagram of one form of the process, cracked gasoline distillate is transferred from tank 1 through line 2 to treater 3, in which it may be treated with sulfuric acid and alkali or the like to effect removal of objectionable compounds, such as sulfur compounds. Treating reagent is introduced through line 4 and sludge is removed by means of drain 5. Treater 3 may be by-passed by way of by-pass line 6, if desired. The distillate then proceeds through line 7 to heating coil 8 in furnace 9, where it is heated, and is then fractionated in fractionator 10 into which the heated distillate is introduced through transfer line 11. From the fractionator 10 a top and bottom stream as well as several side streams are removed. The top stream goes through line 12 to tank 13. The 1st, 3rd, 5th and 7th side streams which are selected to contain objectionable compounds in relatively high concentration, are withdrawn through manifold 14 and line 15 to storage. In some cases such objectionable compounds are found particularly in fractions wherein aromatics are concentrated. Therefore, since by suitable fractional distillation of a cracked distillate benzene can be concentrated in a fraction boiling from about 75-85° C., toluene in a 105-115° C. fraction, and xylenes and ethyl benzene in a 135-145° C. fraction, the column may be operated under such conditions as to produce fractions having approximately the above boiling ranges and withdrawing them through line 15.

The 2nd, 4th and 6th side streams which are substantially free from objectionable compounds pass through lines 16, 17, 18 and 19 to tanks 20, 21, 22, 23, respectively. The fractions in tanks 13 and 20 to 23, may now be introduced singly or in combination with each other through lines 24, 25, 26, 27 and 28, respectively, through manifold 29 and thence through line 30 into treater 31, in which they may be treated to remove remaining objectionable compounds, for example, sulfur compounds. Treating reagent is introduced into treater 31 through line 32 and sludge is removed through drain 33. The treater may be by-passed by way of by-pass line 34, if desired.

The fractions are now transferred through conduit 35 into polymerizer 36, in which they are subjected to a polymerizing reaction with a polymerizing catalyst, catalyst being introduced through line 37, and sludge being drawn off through draw-off line 38. The polymerized fractions from which the sludge has been completely removed are now conveyed through heating coil 39 in furnace 40 to be heated, the heated charge being transferred through transfer line 41 to fractionator 42. In the fractionator the non-polymerized portion of the polymerization product is separated from the polymerized portion by fractional distillation. The polymer is drained through bottom line 43 to tank 44, while non-polymerized hydrocarbons go through line 45 to storage.

To illustrate further the manner in which the invention may be used, the following examples are set forth:

*Example I*

Two liters of a vapor phase cracked distillate with boiling range 25° C.–180° C. were polymerized for 11 hours at 30° C. with 160 gms. aluminum chloride. After distilling off the non-polymerized components and treating the residue with steam at 200° C., 276 gms. of a lubricating oil were obtained, which on being tested for stability against oxidation yielded 13.7% by weight asphaltenes.

When a fraction of the same distillate boiling between 165 and 175° C. was polymerized in the same manner, 324 gms. of a lubricating oil were obtained, which on being tested for stability against oxidation yielded only 1.7% by weight asphaltenes.

On the other hand, a fraction boiling between 75 and 85° C. yielded after polymerization a solid hard mass. The fraction boiling between 105 and 115° C., treated in the same way, yielded 119 gms. of a product with 26.6% by weight asphaltenes produced by the oxidation test, while a fraction boiling between 135 and 145° C. yielded 204 gms. of a lubricating oil, which on being tested for stability against oxidation gave 21.8% by weight asphaltenes. Consequently, neither the last three fractions, nor the distillate as a whole can be considered suitable for polymerization to lubricating oil.

*Example II*

188 gms. of a fraction boiling to 160° C. taken from a vapor phase cracked distillate benzine were polymerized for 11 hours at 30° C. with 20 gms. anhydrous AlCl₃, while stirring. After removing the formed sludge, the resultant liquid was steam-distilled. This yielded 32 gms. of a dark yellow oil, which on being tested for stability against oxidation for 3 hours at 300° C. showed 38.1% by weight asphaltenes.

However, when a quantity of this benzine was pretreated with 5% by weight of 100% sulphuric acid, and 184 gms. of the 135–155° C. fraction from the resultant product were polymerized in the manner described above, then, after separation of the sludge and after steam treatment, 57.7 gms. of a light yellow oil were obtained which on being tested for stability against oxidation for 3 hours at 300° C. showed only 2.2% by weight asphaltenes.

I claim as my invention:

1. In the method of producing improved synthetic oil by catalytic polymerization of a hydrocarbon mixture derived from a cracked gasoline distillate boiling within a range including 75 to 145° C. and containing aromatic components, the steps of fractionally distilling said distillate to produce fractions having boiling ranges of about 75–85° C., 105–115° C., and 135–145° C. and intermediate fractions, separating the first fractions from the intermediate fractions and subjecting at least a portion of the latter to a polymerization with a polymerization catalyst under conditions to produce a substantially oxidation stable synthetic oil.

2. In the method of producing improved synthetic oil by catalytic polymerization of a hydrocarbon mixture derived from a cracked gasoline distillate boiling within a range including 75 to 145° C. and containing aromatic components, the steps of fractionally distilling said distillate to produce fractions having boiling ranges of about 75–85° C., 105–115° C., and 135–145° C. and intermediate fractions, separating the first fractions from the intermediate fractions and subjecting at least a portion of the latter to a polymerization with aluminum chloride under conditions to produce a substantially oxidation-stable synthetic oil.

ADRIANUS JOHANNES van PESKI.